US008421896B2

United States Patent
Sasaki (10) Patent No.: US 8,421,896 B2
(45) Date of Patent: Apr. 16, 2013

(54) ELECTRONIC CAMERA WITH PLURALITY OF IMAGING MODE INCLUDING A SELF IMAGING MODE

(75) Inventor: Go Sasaki, Yawata (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 232 days.

(21) Appl. No.: 12/968,718

(22) Filed: Dec. 15, 2010

(65) Prior Publication Data

US 2011/0149105 A1 Jun. 23, 2011

(30) Foreign Application Priority Data

Dec. 18, 2009 (JP) .................................. 2009-287113

(51) Int. Cl.
*H04N 5/222* (2006.01)

(52) U.S. Cl.
USPC .................................................... 348/333.01

(58) Field of Classification Search ............. 348/207.99, 348/222.1, 333.01, 333.11, 372
See application file for complete search history.

(56) References Cited

U.S. PATENT DOCUMENTS 5,561,462 A * 10/1996 Nagano .......................... 348/372

FOREIGN PATENT DOCUMENTS

JP 2000-305133 A 11/2000

* cited by examiner

*Primary Examiner* — Timothy J Henn (74) *Attorney, Agent, or Firm* — Westerman, Hattori, Daniels & Adrian, LLP (57) ABSTRACT

An electronic camera includes an imager. An imager repeatedly outputs image data representing a forward scene of a camera housing. A first requester requests a monitor having a screen directed to backward of the camera housing to display a moving image based on the image data outputted from the imager. A selector selects any one of a plurality of imaging modes including a self imaging mode in response to a mode selection operation. An adjuster adjusts an imaging condition in a manner to be adapted to the imaging mode selected by the selector. A restrictor restricts the display operation of the monitor after a first time period has elapsed since the timing of the mode selection operation, when the imaging mode selected by the selector is the self imaging mode.

6 Claims, 7 Drawing Sheets

(A) FRONT SURFACE (B) REAR SURFACE

ELECTRONIC CAMERA WITH PLURALITY OF IMAGING MODE INCLUDING A SELF IMAGING MODE

CROSS REFERENCE OF RELATED APPLICATION

The disclosure of Japanese Patent Application No. 2009-287113, which was filed on Dec. 18, 2009, is incorporated herein by reference.

BACKGROUND OF THE INVENTION

1. Field of the Invention

The present invention relates to an electronic camera. More particularly, the present invention relates to an electronic camera which has a self portrait mode photographing an operator oneself.

2. Description of the Related Art

According to one example of this type of camera, when the self portrait mode is set, a focal position of a shooting lens and an aperture value are fixed irrespective of a ranging result and/or a photometry result. On the other hand, when the self portrait mode is cancelled for normal photographing, the ranging result and the photometry result are enabled, and then the focal position of the shooting lens and the aperture value are set to a value suitable for the normal photographing of a subject. Thereby, it becomes possible to adaptively adjust an image quality corresponding to the subject.

However, the above-described camera is not intended to display a real-time moving image representing a scene on an LCD display panel, and is not entirely disclosed with regard to reduction of power consumption of the LCD display panel.

SUMMARY OF THE INVENTION

An electronic camera according to the present invention, comprises: an imager which repeatedly outputs image data representing a forward scene of a camera housing; a first requester which requests a monitor having a screen directed to backward of the camera housing to display a moving image based on the image data outputted from the imager; a selector which selects any one of a plurality of imaging modes including a self imaging mode in response to a mode selection operation; an adjuster which adjusts an imaging condition in a manner to be adapted to the imaging mode selected by the selector; and a restrictor which restricts the display operation of the monitor after a first time period has elapsed since the timing of the mode selection operation, when the imaging mode selected by the selector is the self imaging mode.

An imaging control program product according to the present invention is an imaging control program product executed by a processor of an electronic camera provided with an imager which repeatedly outputs image data representing a forward scene of a camera housing, comprises: a requesting step which requests a monitor having a screen directed to backward of the camera housing to display a moving image based on the image data outputted from the imager; a selecting step which selects any one of a plurality of imaging modes including a self imaging mode in response to a mode selection operation; an adjusting step which adjusts an imaging condition in a manner to be adapted to the imaging mode selected by the selecting step; and a restricting step which restricts the display operation of the monitor after a predetermined time period has elapsed since the timing of the mode selection operation, when the imaging mode selected by the selecting step is the self imaging mode.

An imaging control method according to the present invention is an imaging control method executed by an electronic camera provided with an imager which repeatedly outputs image data representing a forward scene of a camera housing, comprises: a requesting step which requests a monitor having a screen directed to backward of the camera housing to display a moving image based on the image data outputted from the imager; a selecting step which selects any one of a plurality of imaging modes including a self imaging mode in response to a mode selection operation; an adjusting step which adjusts an imaging condition in a manner to be adapted to the imaging mode selected by the selecting step; and a restricting step which restricts the display operation of the monitor after a predetermined time period has elapsed since the timing of the mode selection operation, when the imaging mode selected by the selecting step is the self imaging mode.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
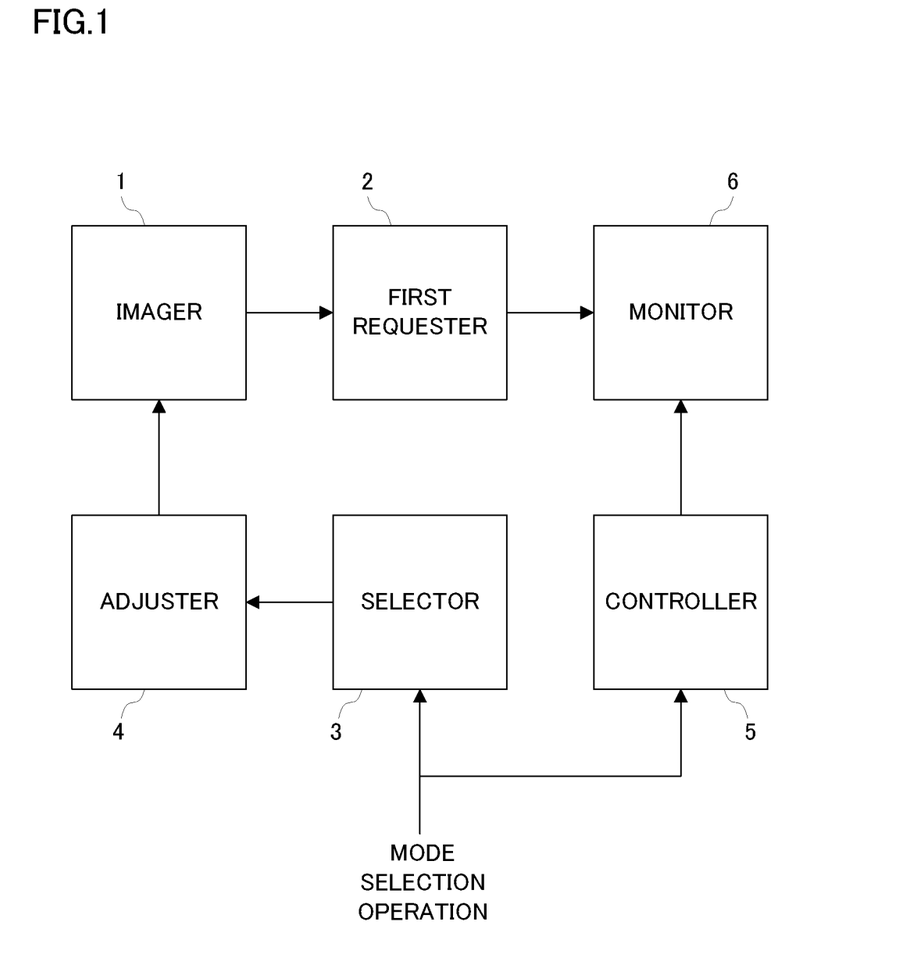
FIG. 1 is a block diagram showing a basic configuration of one embodiment of the present invention.

With reference to FIG. 1, an electronic camera of one embodiment of the present invention is basically configured as follows: An imager 1 repeatedly outputs image data representing a forward scene of a camera housing. A first requester 2 requests a monitor 6 having a screen directed to backward of the camera housing to display a moving image based on the image data outputted from the imager 1. A selector 3 selects any one of a plurality of imaging modes including a self imaging mode in response to a mode selection operation. An adjuster 4 adjusts an imaging condition in a manner to be adapted to the imaging mode selected by the selector 3. A restrictor 5 restricts the display operation of the monitor 6 after a first time period has elapsed since the timing of the mode selection operation, when the imaging mode selected by the selector 3 is the self imaging mode.

The moving image representing the scene is displayed on the screen of the monitor 6 until the first time period has elapsed from when the self imaging mode is selected. An operator shifts to a photographing operation without feeling something wrong with the display operation of the monitor 6.

Moreover, the display operation of the monitor 6 is restricted at time point of the first time period has elapsed. This inhibits an unnecessary display operation. Thus, it becomes possible to reduce a consumed power while operability is ensured.

Figure 2:
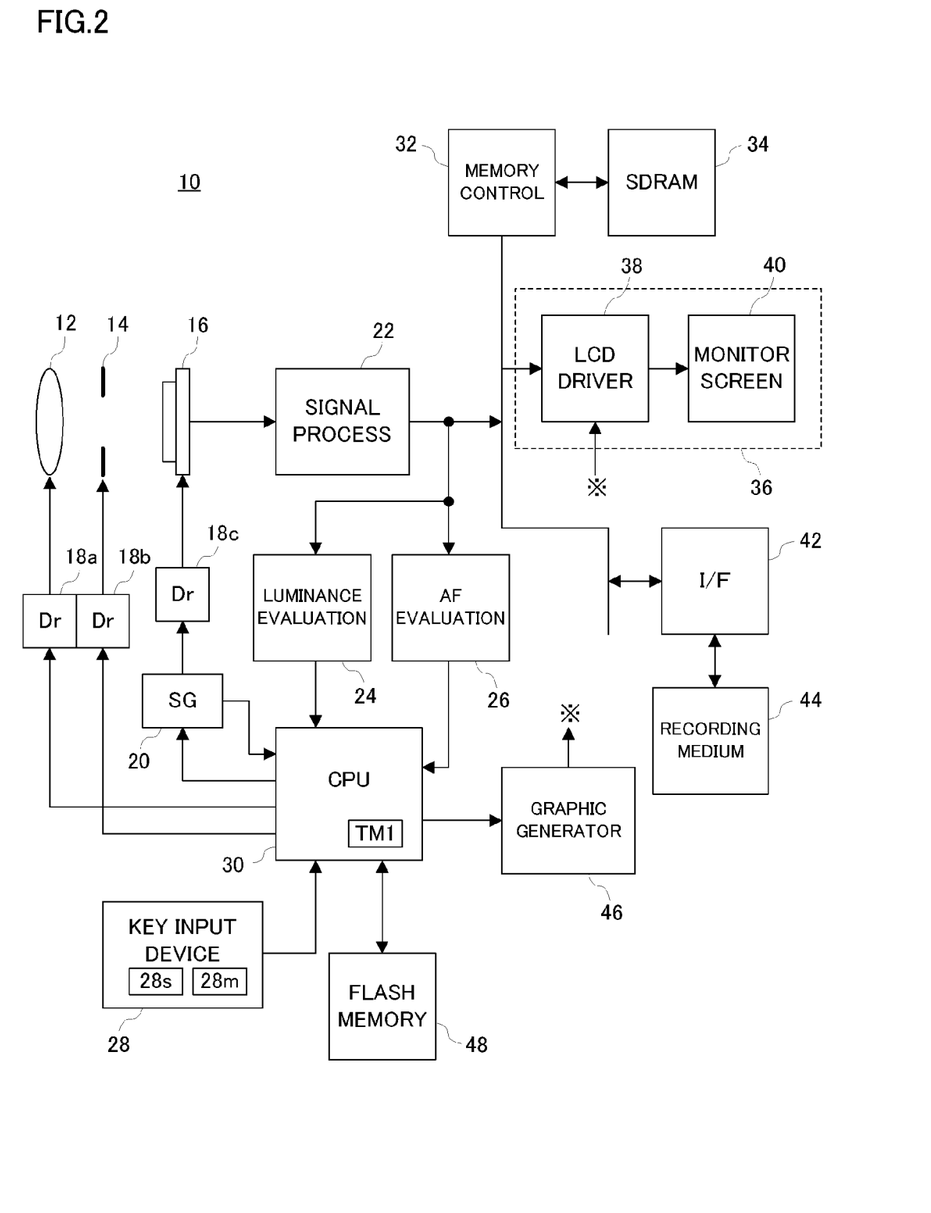
FIG. 2 is a block diagram showing a configuration of one embodiment of the present invention.

With reference to FIG. 2, a digital camera 10 according to this embodiment includes a focus lens 12 and an aperture mechanism 14 respectively driven by drivers 18a and 18b. An optical image of the scene that undergoes the focus lens 12 and the aperture mechanism 14 enters, with irradiation, an imaging surface of an imaging device 16, and is subjected to a photoelectric conversion. Thereby, electric charges representing the scene image are produced.

When a power source is applied, under a setting control task, a CPU 30 sets a cycle of a vertical synchronization signal Vsync outputted from an SG (Signal Generator) 20 to 1/60th of a second, and concurrently, turns on an LCD unit 36. Moreover, the CPU 30 commands a driver 18c to repeat a pre-exposure procedure and a thinning-out reading-out procedure in order to execute a moving-image taking process under an imaging task.

In response to the vertical synchronization signal Vsync outputted from the SG 20, the driver 18c performs the pre-exposure on the imaging surface and also reads out a part of the electric charges produced on the imaging surface in a raster scanning manner. From the imaging device 16, raw image data based on the read-out electric charges is outputted at a frame rate of 60 fps.

A signal processing circuit 22 performs processes, such as white balance adjustment, color separation, and YUV conversion, on the raw image data outputted from the imaging device 16, and writes YUV formatted-image data created by these processes into an SDRAM 34 through a memory control circuit 32. An LCD driver 38 configuring the LCD unit 36 repeatedly reads out the image data written into the SDRAM 34 through the memory control circuit 32, and displays a real-time moving image based on the read-out image data on a monitor screen 40.

An imaging mode is switched between a normal mode and a self portrait mode (the self imaging mode) in response to an operation of a mode selector switch 28m arranged in a key input device 28. Under a mode control task, the CPU 30 requests a graphic generator 46 to output a graphic image data corresponding to the selected imaging mode.

Based on the graphic image data outputted from the graphic generator 46 in response to the request from the CPU 30, the LCD driver 38 displays an icon identifying the imaging mode on the monitor screen 40. As a result, when the normal mode is selected, an icon IC1 is displayed on the monitor screen 40 as shown in FIG. 3(A). Moreover, when the self portrait mode is selected, an icon IC2 is displayed on the monitor screen 40 as shown in FIG. 3(B).

Figure 4:
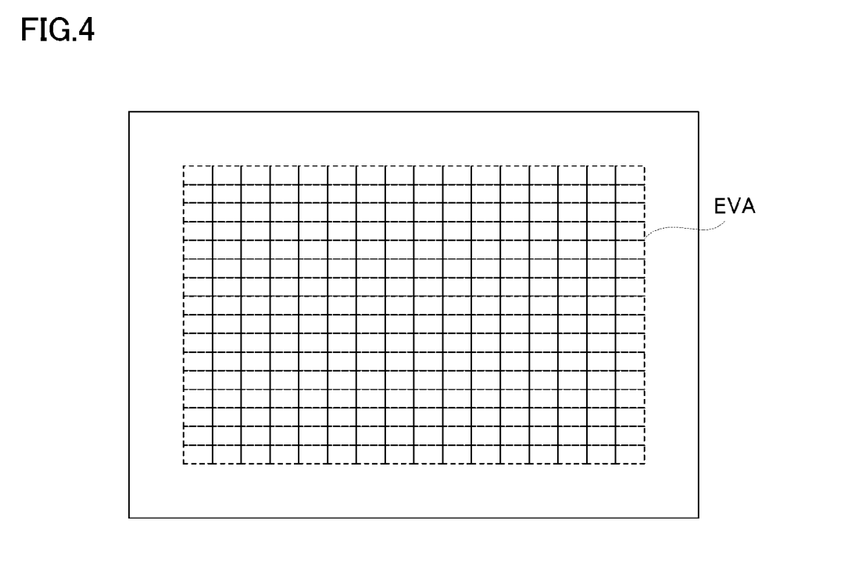
FIG. 4 is an illustrative view showing an allocation state of an evaluation area on an imaging surface.

With reference to FIG. 4, an evaluation area EVA is allocated to a center of the imaging surface. The evaluation area EVA is divided into 16 portions in each of a vertical direction and a horizontal direction. That is, the evaluation area EVA is equivalent to a group of a total of 256 divided areas.

In response to the vertical synchronization signal Vsync, a luminance evaluating circuit 24 integrates Y data belonging to the evaluation area EVA, out of the Y data outputted from the signal processing circuit 22, for each divided area. As a result, 256 AE evaluation values respectively corresponding to the 256 divided areas are outputted from the AE evaluating circuit 24 in response to the vertical synchronization signal Vsync.

In response to the vertical synchronization signal Vsync, an AF evaluating circuit 26 integrates a high-frequency component of the Y data belonging to the evaluation area EVA, out of the Y data outputted from the signal processing circuit 22, for each divided area. Thereby, 256 AF evaluation values respectively corresponding to the 256 divided areas are outputted from the AF evaluating circuit 26 in response to the vertical synchronization signal Vsync.

A shutter button 28s arranged in the key input device 28 is transitioned among states ST0 to ST3. The state ST0 is equivalent to a non-operated state, the state ST1 is equivalent to a half-depressed state of the shutter button 28s, and the state ST2 is equivalent to a fully-depressed state of the shutter button 28s. When the state of the shutter button 28s is "ST0", the CPU 30 repeatedly executes a simple AE process under the imaging task in order to calculate an appropriate EV value based on the 256 luminance evaluation values outputted from the luminance evaluating circuit 24. An aperture amount and an exposure time period that define the calculated appropriate EV value are respectively set to the drivers 18b and 18c. As a result, a brightness of a through image displayed on the LCD monitor 38 is adjusted moderately.

When the state of the shutter button 28s is transitioned to "ST1", the CPU 30 executes a strict AE process under the imaging task in order to calculate an optimal EV value based on the 256 luminance evaluation values outputted from the luminance evaluating circuit 24. Similarly to the above-described case, an aperture amount and an exposure time period that define the calculated optimal EV value are respectively set to the drivers 18b and 18c.

Subsequently, the CPU 30 executes an AF process under the imaging task The focus lens 12 is moved in an optical-axis direction, and the 256 AF evaluation values outputted from the focus evaluating circuit 26 are repeatedly taken into in parallel with the moving process of the focus lens 12. A focal point is searched based on the taken AF evaluation value, and the focus lens 12 is placed at the discovered focal point.

When the normal mode is set, the CPU 30 selects both an AE reference and an AF reference corresponding to the normal mode under the mode control task. When the self portrait mode is set, the CPU 30 also selects both an AE reference and an AF reference corresponding to the self portrait mode under the mode control task The simple AE process and the strict AE process are executed according to the selected AE reference, and the AF process is executed according to the selected AF reference.

When the state of the shutter button 28s is transitioned to "ST2", a recording process is executed. The CPU 30 commands the driver 18c to execute a main exposure procedure and all-pixel reading-out, one time each. The driver 18c performs the main exposure on the imaging surface in response to the generation of the vertical synchronization signal Vsync, and reads out all the electric charges produced on the imaging surface in a raster scanning manner. As a result, high-resolution raw image data representing the scene is outputted from the imaging device 16.

The outputted raw image data is subjected to a process similar to that described above, and as a result, high-resolution image data according to the YUV format is secured in the SDRAM 34. An I/F 42 reads out the high-resolution image data thus accommodated in the SDRAM 34 through the memory control circuit 32, and then, records the read-out image data on a recording medium 44 in a file format It is noted that the moving-image taking process is resumed at a time point when the high-resolution image data is accommodated in the SDRAM 34.

Figure 5:
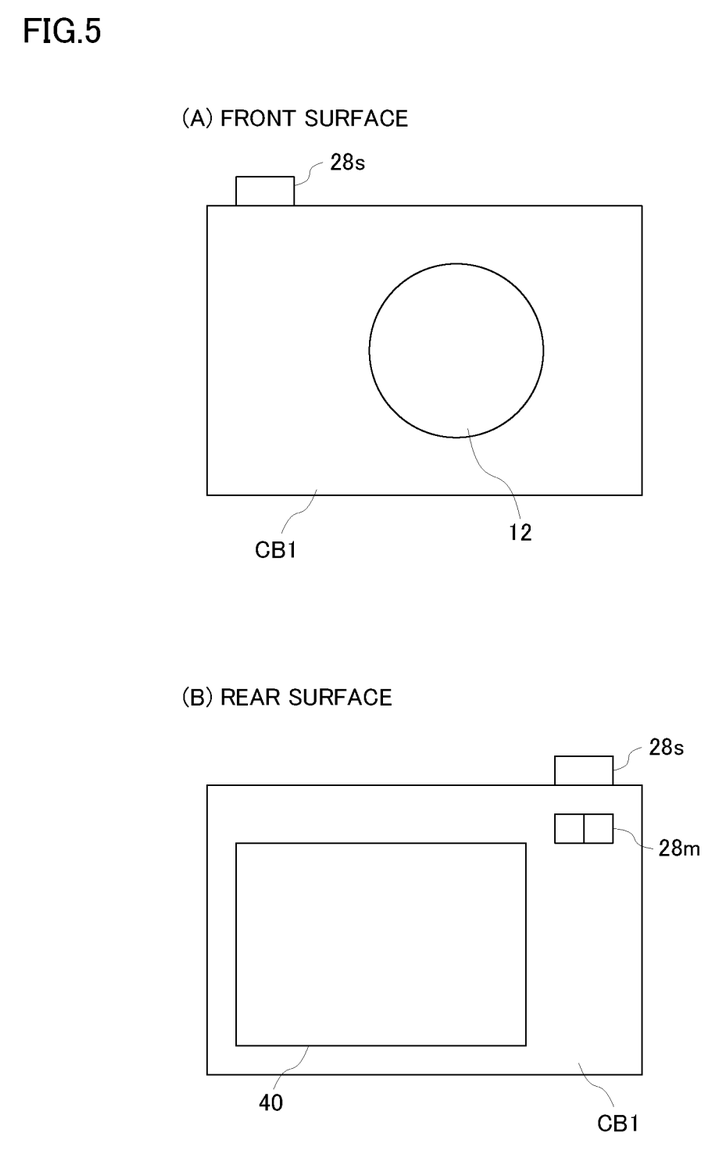
FIG. 5(A) is an illustrative view showing a state that the embodiment in FIG. 2 is viewed from a front.
FIG. 5(B) is an illustrative view showing a state that the embodiment in FIG. 2 is viewed from a rear.

With reference to FIG. 5(A) to FIG. 5(B), the imaging device 16 is arranged so that the imaging surface captures the forward scene of a camera housing CB 1, and the LCD unit 36 is arranged so that the monitor screen 40 directs to backward of the camera housing CB1. Since the self portrait mode is the mode to photograph a face of the operator, when the imaging surface is directed to the face of the operator after the self portrait mode is selected, it becomes impossible that the operator recognizes the monitor screen 40 by sight. Power feeding to the LCD unit 36 in this state leads to a waste of power.

On the other hand, when the LCD unit 36 is turned off concurrently with the selection of the self portrait mode, the operator feels something wrong with the display operation of the LCD unit 36. Moreover, since the icon IC2 indicating the self portrait mode is not displayed on the monitor screen 40, it causes a deterioration of the operability.

Then, when the imaging mode is switched to the self portrait mode, the CPU 30 executes resetting and starting a timer TM1 under the setting control task, and then turns off the LCD unit 36 in response to time-out of the timer TM1. Herein, a time period until the time-out is occurred in the timer TM1 is three seconds, for example.

The operator confirms the switching to the self portrait mode by the display of the icon IC2, and thereafter directs the imaging surface to the face of the operator. Thereafter, the LCD unit 36 is turned off. Thereby, it is possible to reduce the consumed power while the operability is ensured.

It is noted that, in the self portrait mode, necessity of emphasizing a shutter chance is low. Then, when the time-out is occurred in the timer TM1, in addition to turning off the LCD unit 36, the CPU 30 extends the cycle of the vertical synchronization signal Vsync outputted from the SG20 from $\frac{1}{60}$th of a second to $\frac{1}{30}$th of a second. Thereby, it becomes possible to further reduce the consumed power.

Settings of thus changed LCD unit 36 and SG20 are reset after 0.5 seconds from when the state of the shutter button 28s is shifted to "ST2", or are quickly reset in response to a mode switching operation. Thereby, the operability is ensured.

Figure 6:
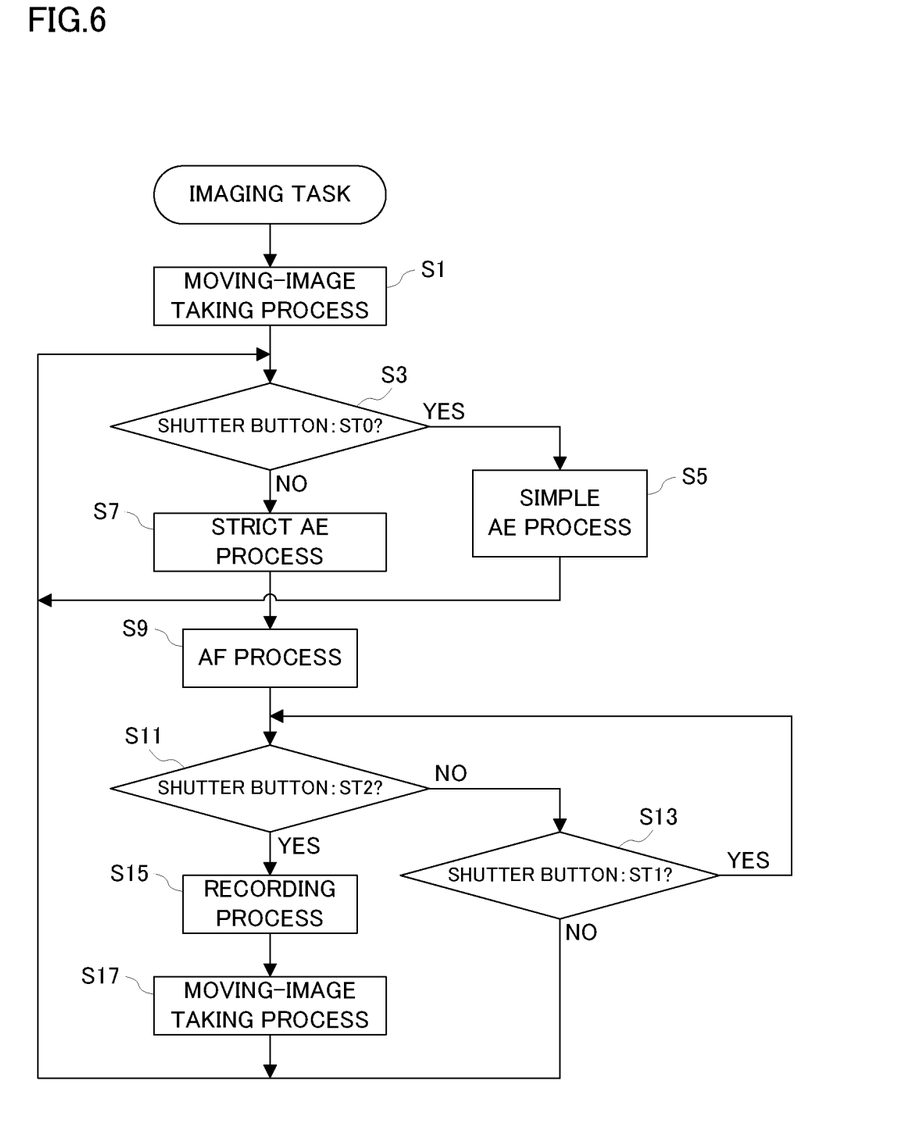
FIG. 6 is a flowchart showing one portion of behavior of a CPU applied to the embodiment in FIG. 2.
Figure 7:
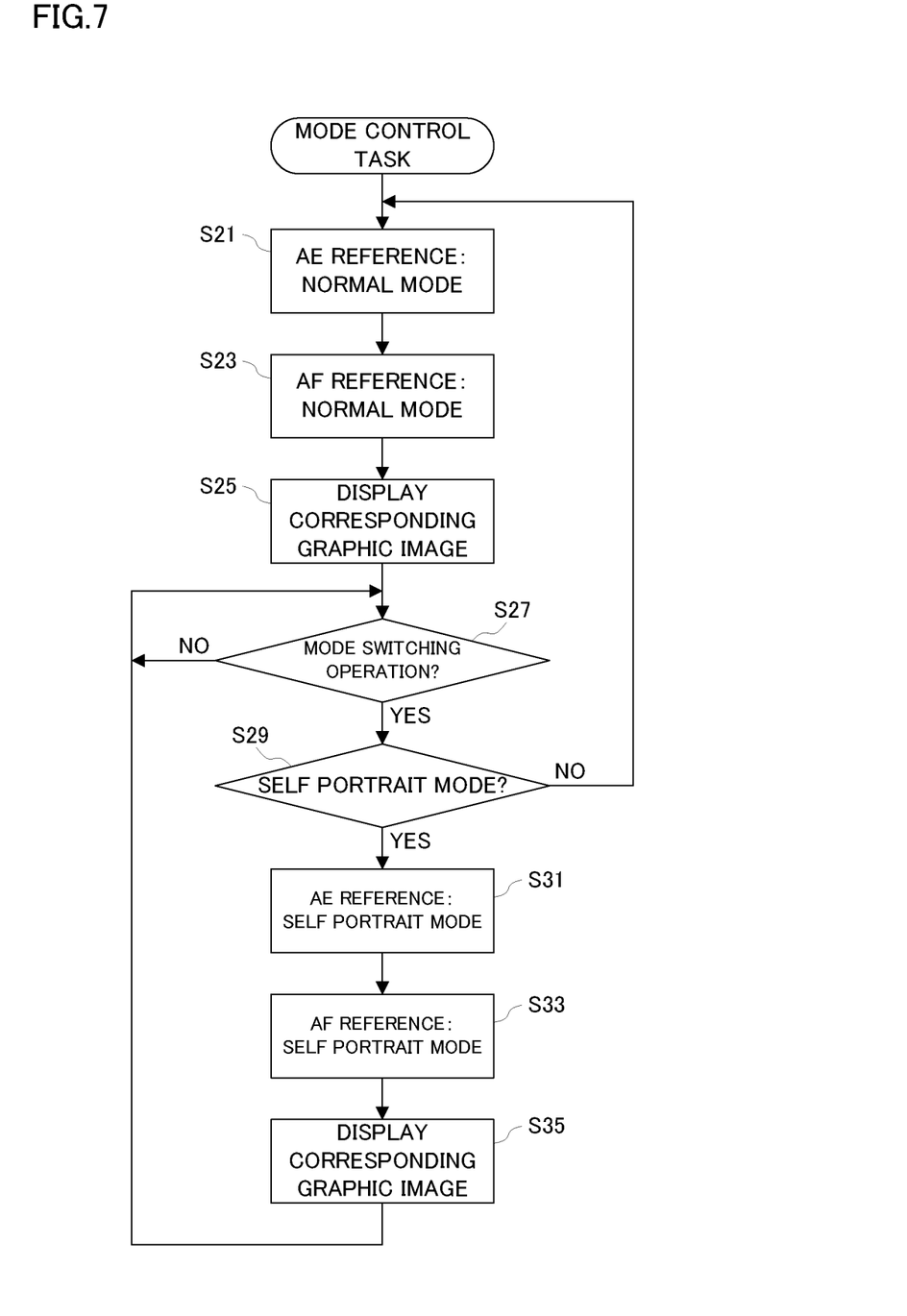
FIG. 7 is a flowchart showing another portion of behavior of the CPU applied to the embodiment in FIG. 2.
Figure 8:
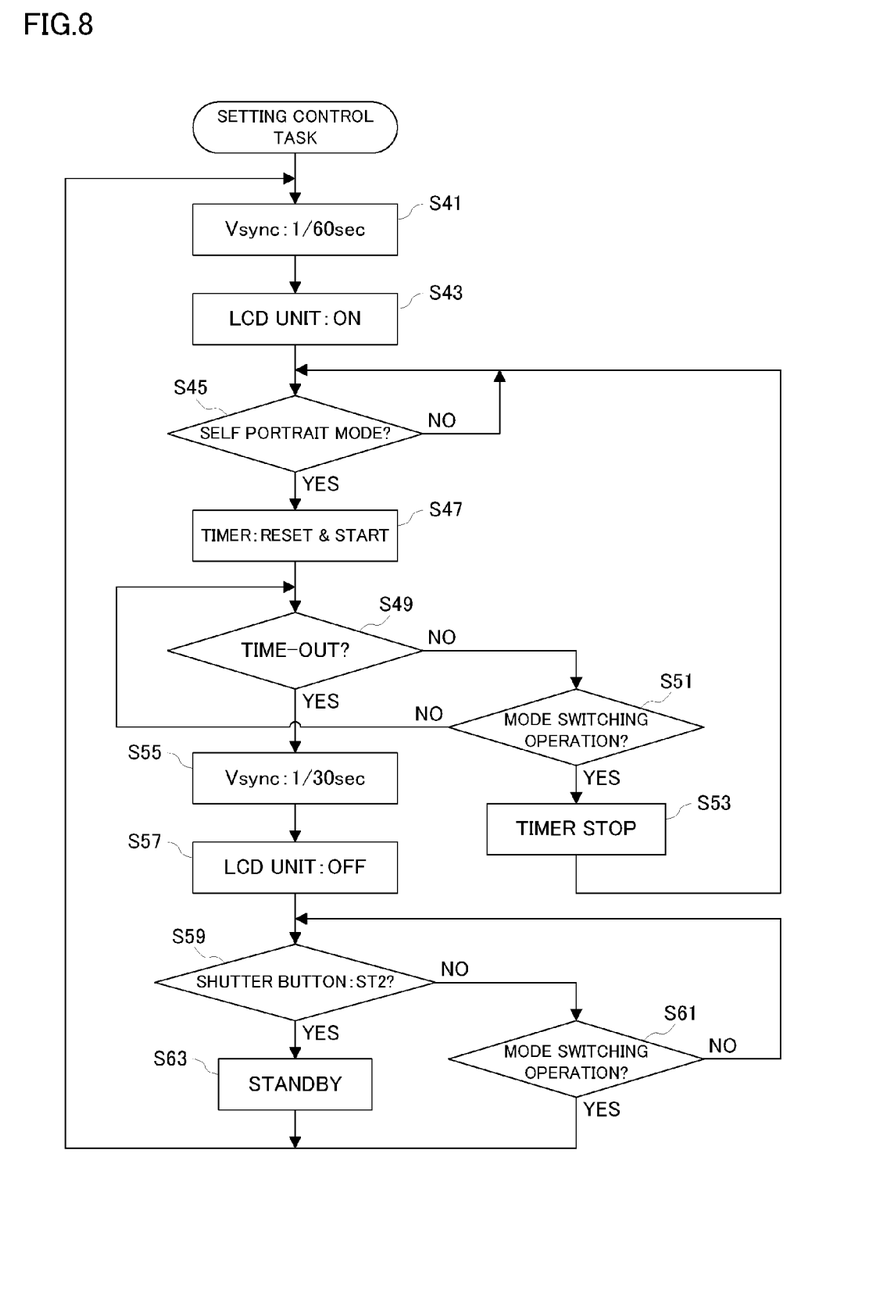
FIG. 8 is a flowchart showing still another portion of behavior of the CPU applied to the embodiment in FIG. 2.

The CPU 30 executes processes according to the imaging task shown in FIG. 6 to FIG. 8. A control program corresponding to the imaging task is memorized in a flash memory 48.

With reference to FIG. 6, in a step S1, the moving-image taking process is executed. As a result, the real-time moving image representing the scene is displayed on the monitor screen 40. In a step S3, it is determined whether or not the state of the shutter button 28s is "ST0", and as long as the determined result is YES, the simple AE process in a step S5 is repeated. As a result, the brightness of the through image is adjusted moderately.

When the state of the shutter button 28s is shifted to "ST1" or "ST2", the strict AE process is executed in a step S7, and then the AF process is executed in a step S9. The brightness of the through image is strictly adjusted by the process in the step S7, and the focus lens 12 is placed at the focal point by the process in the step S9.

In a step S11, it is determined whether or not the state of the shutter button 28s is "ST2", and in a step S13, it is determined whether or not the state of the shutter button 28s is "ST1". When YES is determined in the step S11, the recording process is executed in a step S15 so as to resume the moving-image taking process in a step S17, and thereafter, the process returns to the step S3. When NO is determined in the step S13, the process directly returns to the step S3. When YES is determined in the step S13, the process returns to the step S11.

Figure 3:
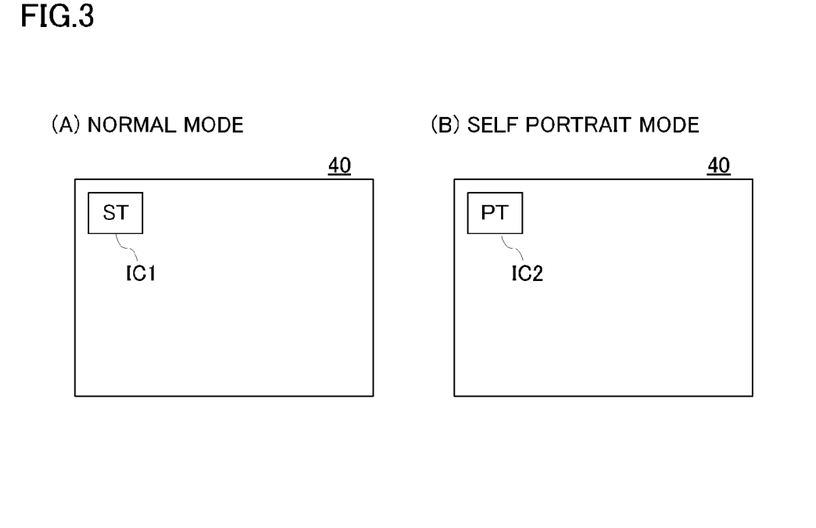
FIG. 3(A) is an illustrative view showing a display state of an icon indicating a normal mode.
FIG. 3(B) is an illustrative view showing a display state of an icon indicating a self portrait mode.

With reference to FIG. 7, in a step S21, the AE reference corresponding to the normal mode is selected, and in a step S23, the AF reference corresponding to the normal mode is selected. As a result, the simple AE process in the step S5 and the strict AE process in the step S7 are executed according to the AE reference corresponding to the normal mode. Moreover, the AF process in the step S9 is executed according to the AF reference corresponding to the normal mode. In a step S25, the graphic generator 44 is requested to output the graphic image data corresponding to the normal mode. As a result, the icon IC1 is displayed on the monitor screen 40 as shown in FIG. 3 (A).

In a step S27, it is determined whether or not the mode switching operation is performed. When the determined result is updated from NO to YES, in a step S29, it is determined whether or not the imaging mode after switching is the self portrait mode. When the determined result is NO, the process returns to the step S21 while when the determined result is YES, the process advances to a step S31.

In the step S31, the AE reference corresponding to the self portrait mode is selected, and in a step S33, the AF reference corresponding to the self portrait mode is selected. As a result, the simple AE process in the step S5 and the strict AE process in the step S7 are executed according to the AE reference corresponding to the self portrait mode. Moreover, the AF process in the step S9 is executed according to the AF reference corresponding to the self portrait mode. In a step S35, the graphic generator 44 is requested to output the graphic image data corresponding to the self portrait mode. As a result, the icon IC2 is displayed on the monitor screen 40 as shown in FIG. 3(B). Upon completion of the process in the step S35, the process returns to the step S27.

With reference to FIG. 8, in a step S41, the generation cycle of the vertical synchronization signal Vsync is set to $\frac{1}{60}$th of a second, and in a step S43, the LCD unit 36 is turned on. From the imaging device 16, the raw image data is outputted at a frame rate of 60 fps, and the real-time moving image based on the outputted raw image data is displayed on the monitor screen 40.

In a step S45, it is repeatedly determined whether or not the self portrait mode is selected. When the determined result is updated from NO to YES, resetting and starting the timer TM1 is executed in a step S47. In a step S49, it is determined whether or not the time-out is occurred in the timer TM1 (whether or not three seconds have elapsed), and in a step S51, it is determined whether or not the mode switching operation is performed. When the mode switching operation is executed before the time-out is occurred, YES is determined in the step S51 so as to stop the timer TM1 in a step S53, and thereafter, the process returns to the step S45.

When the time-out is occurred before the mode switching operation is performed, YES is determined in the step S49 so as to set the generation cycle of the vertical synchronization signal Vsync to $\frac{1}{30}$th of a second in a step S55, and concurrently, the LCD monitor 38 is turned off in a step S57. As a result, the frame rate of the raw image data outputted from the imaging device 16 is decreased from 60 fps to 30 fps, and the through image based on the raw image data is suspended to display.

In a step S59, it is determined whether or not the state of the shutter button 28s is shifted to "ST2", and in a step S61, it is determined whether or not the mode switching operation is performed. When YES is determined in the step S59, the process stands by for 0.5 seconds in a step S63 and thereafter returns to the step S41. On the other hand, when YES is determined in the step S61, the process directly returns to the step S41.

As can be seen from the above-described explanation, the imaging device 16 repeatedly outputs the raw image data representing the forward scene of the camera housing CB1. The CPU30 requests the LCD unit 36 having the monitor screen 40 directed to backward of the camera housing CB1 to display the through image based on the raw image data outputted from the imaging device 16. Moreover, the CPU 30 selects any one of the plurality of imaging modes (photographing modes) including the self portrait mode in response to the mode selection operation (S21~S23, S27~S33), and adjusts the imaging condition (photographing condition) in the manner to be adapted to the selected imaging mode (S5~S9). Furthermore, when the selected imaging mode is the self portrait mode, the CPU 30 restricts the display operation of the LCD unit 36 after three seconds have elapsed since the timing of the mode selection operation (S57).

The moving image representing the scene is displayed on the monitor screen 40 until three seconds have elapsed from when the self portrait mode is selected. The operator shifts to the photographing operation without feeling something wrong with the display operation of the LCD unit 36. Moreover, the display operation of the LCD unit 36 is restricted at a time point of three seconds have elapsed. This inhibits the unnecessary display operation. Thus, it becomes possible to reduce the consumed power while the operability is ensured.

It is noted that, in this embodiment, the setting is quickly reset in response to the mode switching operation after the settings of the SG20 and the LCD unit 36 are changed (see the step S61 in FIG. 8). However, the settings may be quickly reset in response to an operation different from the mode switching operation (except the operation of the shutter button 28m, however).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
    an imager which repeatedly outputs image data representing a forward scene of a camera housing;
    a first requester which requests a monitor having a screen directed to backward of the camera housing to display a moving image based on the image data outputted from said imager;
    a selector which selects any one of a plurality of imaging modes including a self imaging mode in response to a mode selection operation;
    an adjuster which adjusts an imaging condition in a manner to be adapted to the imaging mode selected by said selector;
    a restrictor which restricts a display process of said monitor after a first time period has elapsed since the timing of the mode selection operation, when the imaging mode selected by said selector is the self imaging mode;
    a recorder which performs a recording process on the image data outputted from said imager corresponding to a recording operation executed after the mode selection operation; and
    a first canceller which cancels the restriction of said restrictor after a second time period shorter than the first time period has elapsed since the timing of the recording operation.

2. An electronic camera according to claim 1, further comprising a second canceller which cancels the restriction of said restrictor in response to another operation prior to the recording operation.

3. An electronic camera according to claim 1, further comprising a second requester which requests said monitor to display a graphic image corresponding to the imaging mode selected by said selector.

4. An electronic camera, comprising:
    an imager which repeatedly outputs image data representing a forward scene of a camera housing;
    a first requester which requests a monitor having a screen directed to backward of the camera housing to display a moving image based on the image data outputted from said imager;
    a selector which selects any one of a plurality of imaging modes including a self imaging mode in response to a mode selection operation;
    an adjuster which adjusts an imaging condition in a manner to be adapted to the imaging mode selected by said selector;
    a restrictor which restricts a display process of said monitor after a first time period has elapsed since the timing of the mode selection operation, when the imaging mode selected by said selector is the self imaging mode; and
    an extender which extends an imaging cycle of said imager in association with the restriction of said restrictor.

5. An imaging control program recorded on a non-transitory recording medium in order to control an electronic camera provided with an imager which repeatedly outputs image data representing a forward scene of a camera housing, the program causing a processor of the electronic camera to perform the steps, comprising:
    a requesting step which requests a monitor having a screen directed to backward of the camera housing to display a moving image based on the image data outputted from said imager;
    a selecting step which selects any one of a plurality of imaging modes including a self imaging mode in response to a mode selection operation;
    an adjusting step which adjusts an imaging condition in a manner to be adapted to the imaging mode selected by said selecting step;
    a restricting step which restricts a display process of said monitor after a first time period has elapsed since the timing of the mode selection operation, when the imaging mode selected by said selecting step is the self imaging mode;
    a recording step which performs a recording process on the image data outputted from said imager corresponding to a recording operation executed after the mode selection operation; and
    a canceling step which cancels the restriction of said restricting step after a second time period shorter than the first time period has elapsed since the timing of the recording operation.

6. An imaging control method executed by an electronic camera provided with an imager which repeatedly outputs image data representing a forward scene of a camera housing, the imaging control method comprising:
    a requesting step which requests a monitor having a screen directed to backward of the camera housing to display a moving image based on the image data outputted from said imager;
    a selecting step which selects any one of a plurality of imaging modes including a self imaging mode in response to a mode selection operation;
    an adjusting step which adjusts an imaging condition in a manner to be adapted to the imaging mode selected by said selecting step;
    a restricting step which restricts a display process of said monitor after a first time period has elapsed since the timing of the mode selection operation, when the imaging mode selected by said selecting step is the self imaging mode;

a recording step which performs a recording process on the image data outputted from said imager corresponding to a recording operation executed after the mode selection operation; and a canceling step which cancels the restriction of said restricting step after a second time period shorter than the first time period has elapsed since the timing of the recording operation.

\* \* \* \* \*